(12) United States Patent
Hall

(10) Patent No.: US 7,114,683 B2
(45) Date of Patent: Oct. 3, 2006

(54) DEVICE AND METHOD FOR A SPACECRAFT

(75) Inventor: Lars Hall, Sturefors (SE)

(73) Assignee: SAAB Ericsson Space AB, Gothenburg (SE)

( * ) Notice: Subject to any disclaimer, the term of this patent is extended or adjusted under 35 U.S.C. 154(b) by 0 days.

(21) Appl. No.: 10/130,310

(22) PCT Filed: Sep. 5, 2001

(86) PCT No.: PCT/SE01/01884

§ 371 (c)(1),
(2), (4) Date: May 16, 2002

(87) PCT Pub. No.: WO02/22443

PCT Pub. Date: Mar. 21, 2002

(65) Prior Publication Data

US 2002/0153455 A1    Oct. 24, 2002

(30) Foreign Application Priority Data

Sep. 18, 2000   (SE) .................................... 0003315

(51) Int. Cl.
*B64G 1/64* (2006.01)
(52) U.S. Cl. .................. 244/173.1; 244/173.3
(58) Field of Classification Search ............ 244/158 R, 244/161, 2, 131, 1.8 R, 158.1, 159.4, 172.4, 244/173.1–173.3; 102/377–378
See application file for complete search history.

(56) References Cited

U.S. PATENT DOCUMENTS

| 3,122,098 | A | * | 2/1964 | Glennan ...................... 102/378 |
|---|---|---|---|---|
| 3,174,706 | A | * | 3/1965 | Wagner ................... 244/158 R |
| 3,277,826 | A | * | 10/1966 | Silverthorne ................ 102/377 |
| 3,420,470 | A | * | 1/1969 | Meyer ........................ 244/161 |
| 4,848,806 | A | * | 7/1989 | Miller ........................ 244/131 |
| 4,896,848 | A | * | 1/1990 | Ballard et al. ........... 244/171.3 |
| 5,104,070 | A | * | 4/1992 | Johnson et al. ............. 244/161 |
| 5,125,601 | A | * | 6/1992 | Monford, Jr. ............... 244/161 |
| 5,152,482 | A | * | 10/1992 | Perkins et al. ........... 244/173.1 |
| 5,178,347 | A | * | 1/1993 | Johnson et al. .......... 244/158.5 |
| 5,199,672 | A | * | 4/1993 | King et al. ............... 244/173.3 |
| 5,271,582 | A | | 12/1993 | Perkins et al. |
| 5,318,255 | A | * | 6/1994 | Facciano et al. ........ 244/158 R |
| 5,649,680 | A | * | 7/1997 | Andersson ................... 244/161 |
| 5,655,757 | A | | 8/1997 | Starkovich et al. |
| 5,860,624 | A | * | 1/1999 | Obry et al. ............. 244/158 R |
| 6,076,467 | A | * | 6/2000 | Cespedosa et al. ......... 102/378 |
| 6,202,961 | B1 | * | 3/2001 | Wilke et al. ............ 244/158 R |
| 6,227,493 | B1 | * | 5/2001 | Holemans .................... 244/161 |

(Continued)

FOREIGN PATENT DOCUMENTS

EP          0665162          4/1998

(Continued)

*Primary Examiner*—Galen Barefoot
(74) *Attorney, Agent, or Firm*—Bingham McCutchen LLP

(57) ABSTRACT

The invention presented here relates to a device in a spacecraft comprising a carrier rocket, a satellite and a detachable adapter (4) for connecting a satellite to the carrier rocket, where the adapter (4) comprises a wall structure (14, 15) for supporting the satellite on the carrier rocket, and is fixed at its lower rim to the carrier rocket and is fixed at its upper rim to the satellite. The device is characterised in that the adapter (4) is divided essentially across the longitudinal direction of the spacecraft and that both of the adapter parts (12, 13) are detachably connected to each other. The invention comprises the said adapter design and a method for separating the invented device.

30 Claims, 4 Drawing Sheets

U.S. PATENT DOCUMENTS

| | | | |
|---|---|---|---|
| 6,244,541 B1 * | 6/2001 | Hubert | 244/158 R |
| 6,290,182 B1 * | 9/2001 | Grunditz | 244/161 |
| 6,305,871 B1 * | 10/2001 | Lancho Doncel et al. | |
| 6,345,788 B1 * | 2/2002 | Shtarkman | 244/158 R |
| 6,390,416 B1 * | 5/2002 | Holemans | 244/158 R |
| 6,454,214 B1 * | 9/2002 | Smith | 244/158 R |
| 6,494,406 B1 * | 12/2002 | Fukushima et al. | 244/173.3 |
| 6,494,407 B1 * | 12/2002 | Arulf | 244/161 |
| 6,523,784 B1 * | 2/2003 | Steinsiek et al. | 244/161 |
| 6,533,221 B1 * | 3/2003 | Hubert | 244/158 R |
| 6,588,707 B1 * | 7/2003 | Hubert | 244/158 R |
| 2005/0109878 A1 * | 5/2005 | Cruijssen et al. | 244/158 R |

FOREIGN PATENT DOCUMENTS

| | | |
|---|---|---|
| EP | 0905022 | 3/1999 |
| EP | 1002717 | 5/2000 |
| RU | 2190798 | * 10/2002 |

* cited by examiner

DEVICE AND METHOD FOR A SPACECRAFT

TECHNICAL FIELD

The present invention relates to a device in a spacecraft comprising a first craft part, a second craft part with its payload, and a detachable adapter for connecting the second craft part to the first craft part.

The invention also involves the design of the said adapter, as well as a method for separating the craft parts in the invented device.

STATE OF THE ART

A carrier rocket is used for launching craft such as satellites into space. The carrier rocket consists of several engines, which one at a time propel the rocket so as to carry it to an orbital point where the satellite is separated from the carrier rocket. During launching, when one rocket carrier engine is expended the next one takes over, whereupon a part of the carrier rocket comprising the expended engine detaches from the rest of the carrier rocket.

By means of a bolt connection, a carrier rocket adapter is mounted above the engine which powers the rocket carrier the final part of its path towards the orbital point where the satellite is to be detached. The carrier rocket adapter acts as an interface between the carrier rocket and cylindrical structural parts of the satellite, whereby a clamp comprising shoes and a band provide a detachable connection between a carrier rocket adapter and a satellite. In the assembled state the shoes bear on cylindrical structural parts of the satellite and the carrier rocket's adapter, at the same time as the band is pre-stressed around the shoes so that these exert compressive forces on the structural parts and the adapter. During satellite separation an opening mechanism in the clamp is activated, whereby the clamp opens and the satellite is released from the carrier rocket adapter with the aid of separating springs. The carrier rocket adapter has the shape of an envelope surface of a straight cylinder, or the envelope surface of a straight truncated, straight, circular cone, one rim of which, as described above, is mounted above the upper engine by means of, for example, a bolt connection, while the other ribbed rim is prevented by the clamp fitting from moving relative to the ribbed circular structural parts of the satellite.

An arrangement involving a smaller satellite between the carrier rocket adapter and the main satellite is also known. This smaller satellite may extend down into the adapter's internal space. The smaller satellite is detachable from the main satellite and can be separated from it after carrier rocket separation.

DESCRIPTION OF INVENTION

One embodiment of the present invention provides a device for a spacecraft, comprising a first craft part, a second craft part with its payload, and a detachable adapter for connecting the second craft part to the first craft part, where the adapter contains a wall structure which supports the second craft part on the first craft part and is fixed at its lower rim to the first craft part and has at its upper rim a detachable connection with the second craft part. The device is characterised in that the adapter is divided across the longitudinal direction of the spacecraft and that the adapter parts are detachably connected to each other. In one preferred embodiment the the adapter is divided into two adapter parts. In another embodiment the adapter is divided across the longitudinal direction of the spacecraft in several places and thus consists of several adapter parts detachably connected to each other.

Moreover, the invention relates to the said adapter as well as a method for separating the craft parts within the device, which involves the second craft part detaching from the spacecraft after which the adapter part fitted to the second craft part is detached from the remaining spacecraft.

The first craft part is preferably a carrier rocket and the second craft part is preferably a satellite.

In one embodiment the above-mentioned adapter part(s) not connecting to the carrier rocket has (have) internally dedicated positions for equipment for space operation of the adapter part, such as solar panels, power systems, control systems, and on-board computers, but even payloads such as hardware and software for execution of one or more tasks. Thereby the adapter part can operate as a separate independent satellite. In an alternative embodiment, the spaces are occupied by equipment for space operation in the form of small independent satellites designed to release from the above-mentioned adapter part after separation. In a further embodiment, the two above-mentioned embodiments are combined.

The device and the method represented by the invention have several advantages compared with previously known technology. The invention device allows at least one extra satellite to be launched with each rocket firing without needing to modify either the structure of the carrier rocket intended for fitting to the adapter or equivalent structure on the satellite. The influence of the additional satellite on the main satellite during the launching phase and the separation phase is negligible. Furthermore, a greater payload volume can be sent up with every rocket firing, without impacting on the original payload volume. The usefulness of the device is also greater with regard to weight, as the adapter is included in the spacecraft irrespective of whether or not it is used as a satellite structure after satellite separation.

PREFERRED EMBODIMENTS

Figure 1:
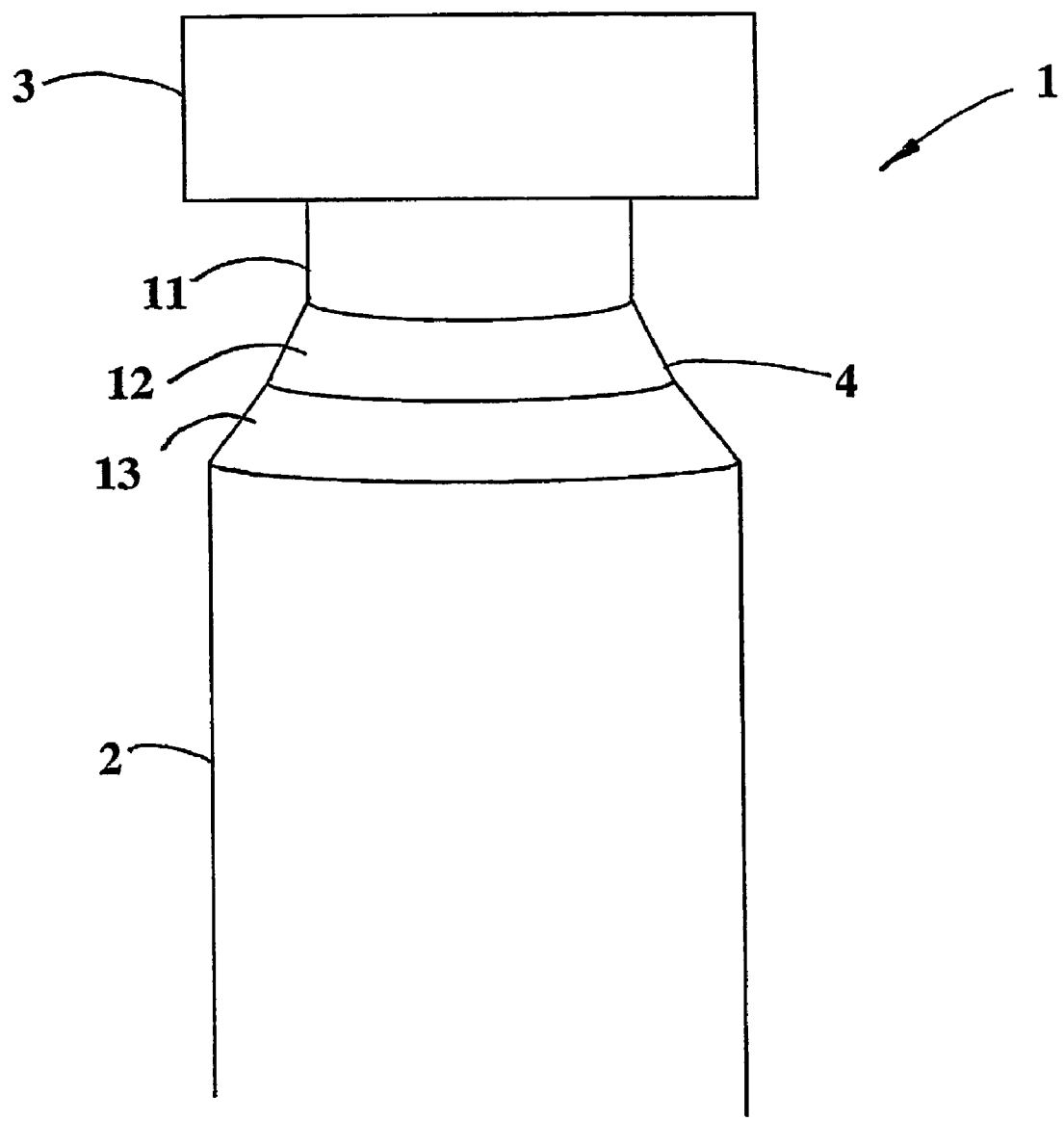
FIG. 1 illustrates schematically an example of a spacecraft.

In FIG. 1 the number 1 denotes a spacecraft comprising a carrier rocket 2 and a detachable craft part 3, in the form of a satellite in the example here. The carrier rocket 2 is constructed of several engines (not shown), which one at a time power the space craft 1 so as to carry it to an orbital point where the satellite 3 is separated from the carrier rocket 2. During launching, when one rocket carrier engine is expended, the next one takes over, whereupon a part of the carrier rocket comprising the expended engine detaches from the rest of the carrier rocket. An adapter 4 is mounted above the carrier rocket 2 engine, which propels the spacecraft 1 the final part of its course towards the orbital point where the satellite 3 is to be detached. The satellite 3 is mounted above the adapter 4; the adapter 4 acts as an interface between the carrier rocket 2 and the satellite 3. The adapter 4 comprises an upper adapter part 12, which, as will be described below in more detail, is detachably fitted to cylindrical structural parts 11 of the satellite 3, and a lower adapter part 13 fitted, for example by bolting, riveting, gluing, or a combination of these, above the last engine section of the carrier rocket.

Figure 2:
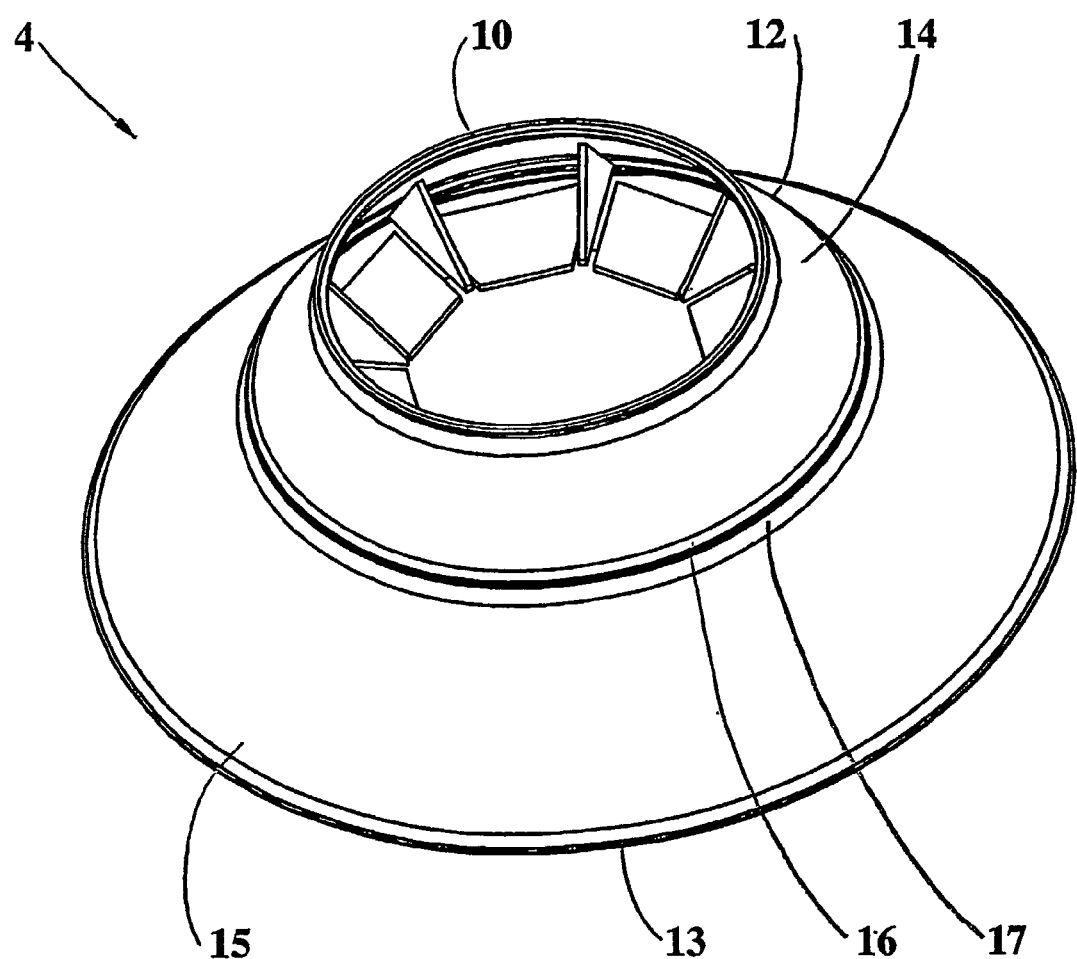
FIG. 2 is a perspective drawing of an adapter in the spacecraft in FIG. 1.

Each carrier rocket part 12, 13 in FIG. 2 comprises a wall 14, 15 in the shape of an envelope surface of a straight truncated, straight, circular cone, where the radius of the wall of the upper adapter part's 12 lower rim 16 essentially coincides with the wall radius of the lower adapter part's 13 upper rim 17. In the example shown, the angle of incline of the upper adapter wall 14 is greater than the angle of incline of the lower adapter wall 15. In an alternative embodiment, the angles of incline of both adapter walls 14, 15 are equally big, while in a further embodiment the angle of incline of the upper adapter wall 14 is less than the angle of incline of the lower adapter wall 15. In the example shown, the lower adapter wall 15 is longer than the upper; in an alternative embodiment, the adapter walls are the same lengths and in a further embodiment, the upper adapter wall is longer than the lower. As well as the adapter 4 being divided, it is constructed according to conventional measurements in order to fit to the carrier rocket and standard interfaces with satellites, and with the same performance as regards strength, etc as existing conventional adapters.

Figure 4:
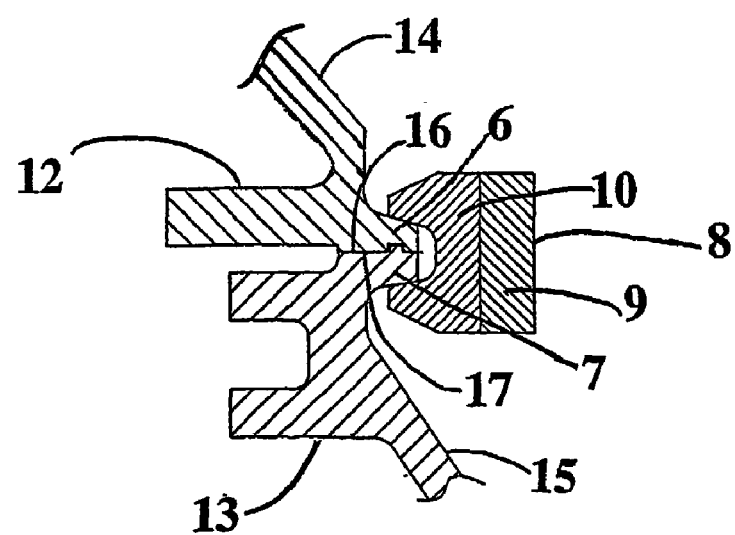
FIG. 4 shows a cross-sectional view of a clamp fitting on the spacecraft.

In FIG. 4, the upper adapter part's 12 wall 14 at its lower rim 16 is furnished with a flange 6 constructed either integrated with the wall 14 as one part, or as a separate part, which is fixed, by riveting for example, to the lower rim 16 of the wall 14. Similarly, the lower adapter part's 13 wall 15 at its upper rim 17 is furnished around the outside with a flange 7. A clamp 8 comprising flanged 6,7 shoes 10 positioned at regular intervals and a band 9 surrounding the shoes join the parts 12, 13 of the adapter 4. An opening mechanism (not shown) in the clamp, on being activated, is arranged to open the clamp, so that the adapter parts 12, 13 have a detachable connection with each other.

The upper rim 10 shown in FIG. 2 also has a flange around the outside and the cylindrical structural parts 11 of the satellite 3 are supplied with flanges. A clamp such as the one described in connection with FIG. 4 forms a detachable connection between the satellite and the adapter part 12, with the shoes resting against the satellite's cylindrical structural parts 11 and the adapter part 12, at the same time as a band is pre-stressed around the shoes so that these exert compressive forces on the satellite and the adapter, thus preventing them from moving in relation to one another.

Figure 3:
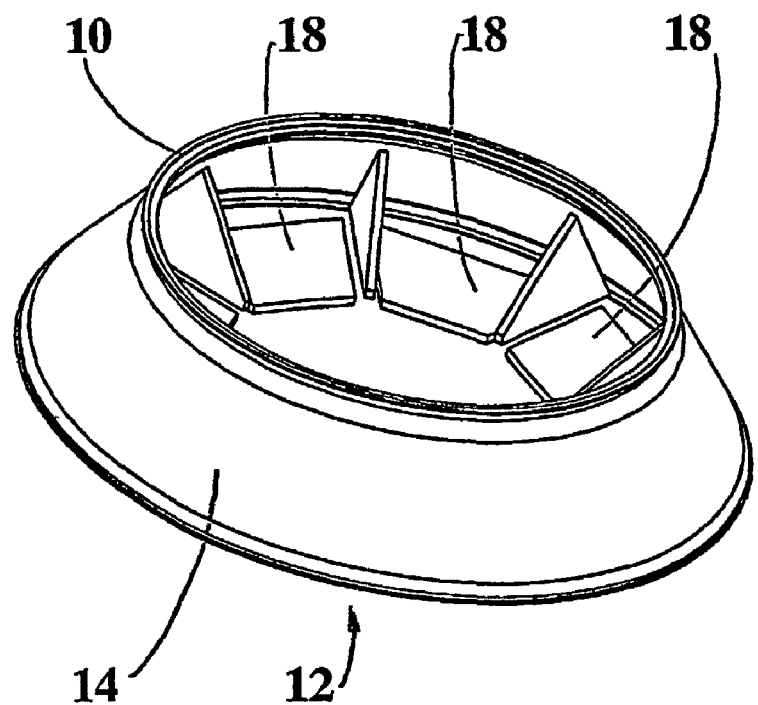
FIG. 3 is a perspective drawing of a part of the adapter in FIG. 2.
Figure 5A:
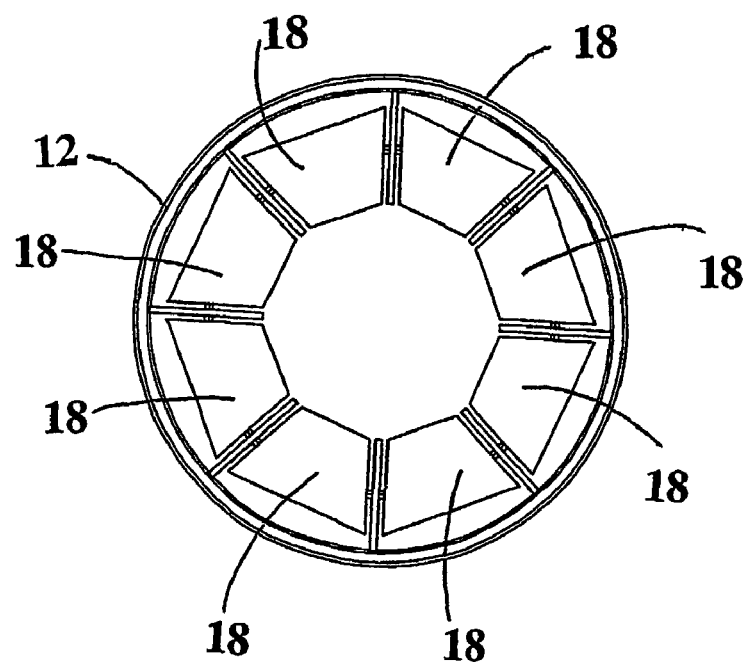
FIG. 5A shows the adapter part in FIG. 3 from above and FIG. 5B shows the corresponding adapter part in an alternative embodiment, also viewed from above.
Figure 5B:
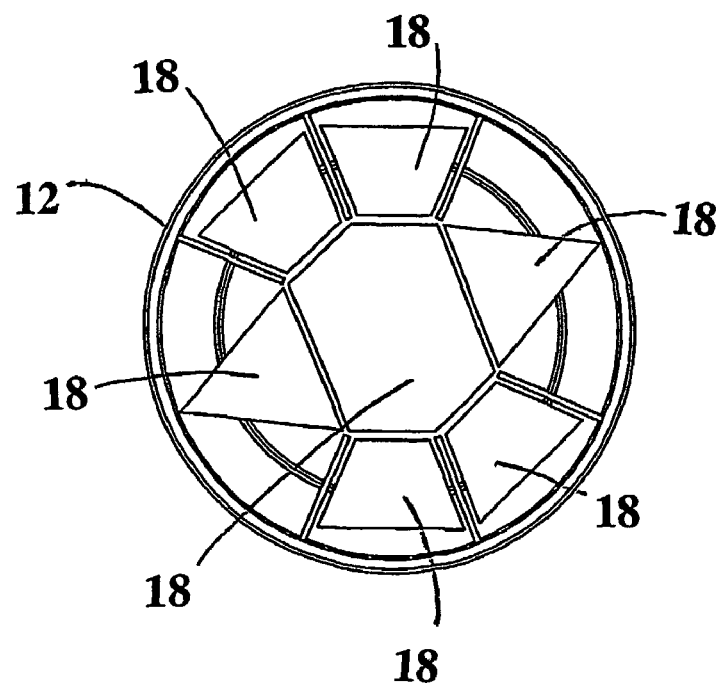

In FIGS. 3 and 5A, the adapter part 12 has internally dedicated attachment positions 18 for various equipment. The amount and complexity of equipment may vary, and may, for example, include all the equipment needed for an independent satellite, such as solar panels, propulsion systems, control systems and on-board computers. Those attachment positions 18 not required for satellite operation may be used for payload, for example hardware and software for executing one or more tasks. FIG. 5B shows an alternative configuration of positions 18 in the adapter part; the only limitation being that the positions 18 must not encroach on the space reserved for parts such as protruding parts of the satellite and/or the carrier rocket. In an alternative embodiment, each of several mounting positions 18 is occupied by a small, independent satellite, so that after clamp separation the adapter part 12 is used as a "dispenser" for releasing small satellites. The adapter part 12 preferably has a control system and a propulsion system for driving the adapter part 12 to a position that is specific for each small satellite and where the satellite is released. Apart from acting as an interface between the carrier rocket's upper engine module and the satellite 3, as well as being a load carrying structure for the satellite 3, a part 12 of the adapter 4 together with the equipment contained therein constitutes an independent spacecraft after clamp separation.

The above-described spacecraft is designed to operate as follows. When the last carrier rocket engine is expended and the satellite 3 has adopted its desired course, an opening mechanism in the clamp between the satellite and the upper adapter part is activated, whereby the clamp opens and the satellite 3 is released from the adapter 4, thus rendering it free to adopt its course in space. Thereafter, the clamp joining the adapter parts opens, whereupon the adapter part 12 is able to leave the carrier rocket and adopt a course in space aided by the equipment in the dedicated positions.

The invention claimed is:

1. A spacecraft device, comprising:
a first craft part;
a second craft part comprising a payload to be released; and
an adapter operative to connect the first craft part and the second craft part, the adapter comprising at least two adapter parts detachably connected to each other, the adapter parts each comprising a wall structure operative to support the second craft part on the first craft part, the adapter comprising a lower rim non-releasably fixed to the first craft part and an upper rim detachably connected to the second craft part wherein at least one of the at least two detachable adapter parts detaches from the remaining adapter part subsequent to detachment and release of the payload, and wherein at least one of the at least two detachable adapter parts comprises one or more internally mounted releasable payloads mounted on dedicated internal payload mounting positions.

2. The spacecraft device according to claim 1, wherein a first of the adapter parts is detachably connected to the second craft part.

3. The spacecraft device according to claim 1, wherein the adapter further comprises internally dedicated positions for equipment for space operation.

4. The spacecraft device according to claim 1, wherein the adapter comprises a truncated cone.

5. The spacecraft device according to claim 2, wherein the second craft part detaches from the first adapter part, after which the first adapter part is detached from the second adapter part.

6. An adapter operative to detachably join a first craft part of a spacecraft with a second craft part to be released, the adapter comprising:
a wall structure operative to support the second craft part on the first craft part, the wall structure comprising a lower rim operative to be non-releasably fixed to the first craft part and an upper rim operative to be detachably connected to the second craft part, the rim wall structure comprising a first adapter part and a second adapter part detachably connected to the first adapter part, wherein one of the two adapter parts detaches from the remaining adapter part in consequence to the release of the second craft part and comprises one or more internally mounted payloads.

7. The adapter according to claim 6, wherein the first adapter part and the second adapter part extend in a longitudinal direction of the spacecraft different distances.

8. The adapter according to claim 6, wherein the first adapter part and the second adapter part extend in a longitudinal direction of the spacecraft substantially equal distances.

9. The adapter according to claim 6, wherein the adapter is divided into the first and second adapter parts in a plane perpendicular to a longitudinal direction of the spacecraft.

10. The adapter according to claim 6, wherein an angle of incline of the first adapter part is different than an angle of incline of the second adapter part.

11. The adapter according to claim 6, wherein at least a portion of the second adapter part is further adapted to operate as an independent satellite.

12. The adapter according to claim 6, wherein the first adapter part and the second adapter part each comprise a flange, the adapter further comprising:
a clamp operative to engage the flanges and detachably connect the first adapter part to the second adapter part.

13. The adapter according to claim 12, wherein the clamp comprises a shoe operative to engage the flanges and a band operative to urge the shoe into connection with the flanges.

14. The spacecraft device according to claim 6, wherein the adapter further comprises internally dedicated positions for equipment for space operation.

15. The adapter according to claim 14, wherein each position is operative for a satellite to be mounted thereon.

16. The adapter according to claim 14, wherein each position is operative for satellite equipment to be mounted thereon.

17. A spacecraft device, comprising:
a carrier rocket;
a satellite to be released;
an adapter operative to connect the satellite to the carrier rocket, the adapter comprising two adapter parts detachably connected to each other, the adapter parts each comprising a wall structure operative to support the satellite on the carrier rocket, the adapter comprising a lower rim non-releasably fixed to the carrier rocket and an upper rim detachably connected to the satellite, wherein one of the two adapter parts detaches from the remaining adapter part in consequence to the release of the satellite and comprises one or more internally mounted payloads.

18. The spacecraft device according to claim 17, wherein a first of the adapter parts is detachably connected to the satellite.

19. The spacecraft device according to claim 17, wherein the adapter further comprises internally dedicated positions for equipment for space operation.

20. The spacecraft device according to claim 17, wherein the adapter comprises a truncated cone.

21. The spacecraft device according to claim 17, wherein the satellite detaches and is released from the spacecraft, after which the adapter is detached from the carrier rocket and operates independently from the carrier rocket.

22. An adapter operative to detachably join a carrier rocket with a satellite to be released, the adapter comprising:
a wall structure operative to support the satellite on the carrier rocket, the wall structure comprising a lower rim operative to be non-releasably fixed to the carrier rocket and an upper rim operative to be detachably connected the satellite, the rim wall structure comprising a first adapter part and a second adapter part detachably connected to the first adapter part, wherein one of the two adapter parts detaches from the remaining adapter part in consequence to the release of the satellite and comprises one or more internally mounted payloads.

23. A method for separating a first spacecraft part from a second spacecraft part detachably connected to the first spacecraft part with an adapter, the method comprising:
detaching the second spacecraft part from an upper part of the adapter detachably connected to the second spacecraft part;
detaching the upper part of the adapter from a remaining portion of the spacecraft, said remaining portion of the spacecraft comprising an adapter part non-releasably fixed to the first spacecraft part; and
detaching subsequently one or more additional satellites from internal mounting positions within the upper part of the adapter.

24. The method according to claim 23, wherein the remaining portion of the spacecraft comprises a lower adapter part and the first spacecraft part.

25. A method for separating a carrier rocket from a satellite detachably connected to the carrier rocket with an adapter, the method comprising:
detaching the satellite from an upper part of the adapter detachably connected to the satellite;
detaching the upper part of the adapter from a lower part of the adapter non-releasably connected to the carrier rocket and detachably connected to the upper part of the adapter; and
detaching subsequently one or more additional satellites from internal mounting positions within the upper part of the adapter.

26. A spacecraft device, comprising:
a first craft part;
a second craft part comprising a payload to be released; and
an adapter operative to connect the first craft part and the second craft part, the adapter comprising a wall structure operative to support the second craft part on the first craft part, the adapter additionally comprising a lower rim non-releasably fixed to the first craft part and an upper rim detachably connected to the second craft part, the adapter further comprising internal equipment or payload attachment positions for mounting equipment or payloads and even further comprising one or more internally mounted payloads, other than the second craft part, useful for space operation, and wherein at least a part of the adapter detaches from a remaining portion of the spacecraft device in consequence to the release of the payload.

27. The spacecraft device according to claim 26, wherein the adapter comprises two adapter parts detachably connected to each other.

28. The spacecraft device according to claim 27, wherein a first of the adapter parts is detachably attached to the second craft part.

29. The spacecraft device according to claim 28, wherein the equipment or payloads mounted at the equipment or payload attachment positions includes at least one of solar panels, power systems, propulsion systems, control systems, on-board computers, independent satellites, and hardware and software for execution of at least one task and wherein at least some of the equipment or payload attachment positions are on or within a second of the adapter parts.

30. The spacecraft device according to claim 29, wherein the second adapter part constitutes a separate satellite after separation from the first craft part and the second craft part.

* * * * *

UNITED STATES PATENT AND TRADEMARK OFFICE
Certificate

Patent No. 7,114,683 B2

Patented: October 3, 2006

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Lars Hall, Sturefors (SE); Johan Ohlin, Rimforsa (SE); and Nils G. Gustafsson, Linghem (SE).

Signed and Sealed this Twenty-second Day of March 2011.

MICHAEL R. MANSEN
*Supervisory Patent Examiner*
Art Unit 3644
Technology Center 3600